(12) United States Patent
Jimenez

(10) Patent No.: US 11,375,703 B2
(45) Date of Patent: Jul. 5, 2022

(54) SNAG FREE FISHING LIFT

(71) Applicant: Maria G. Yracheta, Brazoria, TX (US)

(72) Inventor: George Jimenez, Brazoria, TX (US)

(73) Assignee: Maria G. Yracheta, Brazoria, TX (US)

( * ) Notice: Subject to any disclaimer, the term of this patent is extended or adjusted under 35 U.S.C. 154(b) by 178 days.

(21) Appl. No.: 16/502,856

(22) Filed: Jul. 3, 2019

(65) Prior Publication Data
US 2020/0008413 A1 Jan. 9, 2020

Related U.S. Application Data

(60) Provisional application No. 62/694,017, filed on Jul. 5, 2018.

(51) Int. Cl.
*A01K 91/06* (2006.01)

(52) U.S. Cl.
CPC .................... *A01K 91/06* (2013.01)

(58) Field of Classification Search
CPC ........ A01K 91/00; A01K 91/06; A01K 85/00; B64C 31/06; A63H 27/08
See application file for complete search history.

(56) References Cited

U.S. PATENT DOCUMENTS

| | | | | |
|---|---|---|---|---|
| 1,105,058 A | * | 7/1914 | Boohau | A63H 27/08 244/153 R |
| 1,804,391 A | * | 5/1931 | Abrahams | A01K 85/12 43/42.2 |
| 2,180,918 A | * | 11/1939 | Verzi | A01K 85/14 43/42.52 |
| 2,235,905 A | * | 3/1941 | Sherwood | A01K 85/14 43/42.29 |
| 2,380,328 A | * | 7/1945 | Pecher | A01K 85/14 43/42.29 |
| 2,511,002 A | * | 6/1950 | Perry | A01K 85/14 43/42.5 |
| 2,522,725 A | * | 9/1950 | Schiffmann | A01K 85/14 43/42.06 |
| 2,535,211 A | * | 12/1950 | Jelinek | A01K 85/14 43/42.5 |
| 2,716,832 A | * | 9/1955 | Minnie, III | A01K 95/00 43/43.12 |

(Continued)

OTHER PUBLICATIONS

"Avoiding Snags" https://britishseafishing.co.uk/techniques-and-info/avoiding-snags, 1 page, accessed Jun. 18, 2019.

*Primary Examiner* — Peter M Poon
*Assistant Examiner* — Shada Mohamed Alghailani
(74) *Attorney, Agent, or Firm* — McKee, Voorhees & Sease PLC

(57) ABSTRACT

An improved lift attaches to the leader line of a fishing reel and reduces snags. In use, a user casts a rig including the leader line, an improved lift, a hook, and a weight into the water. The lift includes a body having apertures through which the fishing line extends to mount the lift onto the leader line, upstanding sides, and outwardly extending wings. As the rig moves in the water, the outwardly extending wings of the lift cause the lift to ascend from the bottom of the body of water, thus preventing opportunities for the hook or weight to become snagged, for example on rocks or sunken tree branches.

4 Claims, 3 Drawing Sheets

(56) References Cited

U.S. PATENT DOCUMENTS

| | | | | |
|---|---|---|---|---|
| 2,741,863 | A * | 4/1956 | Magill | A01K 91/08 43/43.13 |
| 3,007,659 | A * | 11/1961 | Zachary | A63H 27/08 244/153 R |
| 3,044,208 | A * | 7/1962 | Minera | A01K 91/06 43/43.13 |
| 3,138,892 | A * | 6/1964 | Hall | A01K 85/00 43/42.25 |
| 3,194,520 | A * | 7/1965 | Kurkjian | B64C 31/032 244/153 R |
| 3,216,147 | A * | 11/1965 | Minera | A01K 91/06 43/43.13 |
| 3,673,727 | A * | 7/1972 | Bauer | A01K 85/14 43/42.5 |
| 3,738,046 | A * | 6/1973 | Johnson | A01K 85/16 43/42.39 |
| 3,863,382 | A * | 2/1975 | Heili | A01K 91/08 43/43.13 |
| 4,161,838 | A * | 7/1979 | Gapen | A01K 91/06 43/42.11 |
| 4,237,644 | A * | 12/1980 | Hansen | A01K 91/08 43/43.13 |
| 4,510,710 | A * | 4/1985 | Hanna | A01K 85/00 D22/128 |
| 4,594,806 | A * | 6/1986 | Brown | A01K 85/14 43/42.18 |
| 4,771,568 | A * | 9/1988 | Head | A01K 85/00 43/42.29 |
| 4,922,648 | A * | 5/1990 | Louthan | A01K 91/08 43/43.13 |
| 4,927,100 | A * | 5/1990 | Provenzo, Jr. | A63H 27/08 244/153 R |
| 5,732,502 | A * | 3/1998 | Hansen | A01K 85/00 43/42.39 |
| 5,862,623 | A * | 1/1999 | MacPherson | A01K 85/00 43/42.24 |
| 6,108,964 | A * | 8/2000 | Noorlander | A01K 85/14 43/42.5 |
| D435,628 | S * | 12/2000 | Lester | D22/129 |
| 6,279,260 | B1 * | 8/2001 | Farr | A01K 91/06 43/42.5 |
| D472,955 | S * | 4/2003 | Hyneman | D22/129 |
| 6,643,975 | B1 * | 11/2003 | Edwards | A01K 85/14 43/42.31 |
| 7,117,629 | B2 * | 10/2006 | Brzozowski | A01K 91/00 43/43.15 |
| 7,444,778 | B2 * | 11/2008 | Snowberger | A01K 91/08 43/43.13 |
| 7,546,704 | B1 * | 6/2009 | Canales | A01K 91/06 43/44.9 |
| 7,596,901 | B1 * | 10/2009 | Johnson | A01K 91/06 43/42.22 |
| 8,789,307 | B1 * | 7/2014 | Talbot | A01K 85/00 43/42.47 |
| 9,288,971 | B2 * | 3/2016 | Yelton | A01K 85/14 |
| 9,717,223 | B1 * | 8/2017 | Wilhelm | A01K 91/06 |
| D823,983 | S * | 7/2018 | Wilhelm | A01K 85/12 D22/129 |
| 2002/0083637 | A1 * | 7/2002 | Lee | A01K 85/00 43/42.19 |
| 2006/0156612 | A1 * | 7/2006 | Brzozowski | A01K 91/14 43/43.15 |
| 2008/0040966 | A1 * | 2/2008 | Stone | A01K 91/053 43/42.74 |
| 2010/0083560 | A1 * | 4/2010 | Blackshear, Jr. | A01K 97/02 43/44.99 |

* cited by examiner

SNAG FREE FISHING LIFT

CROSS REFERENCE TO RELATED APPLICATIONS

This application claims priority under 35 U.S.C. § 119 to provisional patent application U.S. Ser. No. 62/694,017, filed Jul. 5, 2018. The provisional patent application is herein incorporated by reference in its entirety.

FIELD OF THE INVENTION

The present invention relates generally to a fishing accessory and corresponding method of use. More particularly, but not exclusively, the present invention relates to an improved lift for eliminating snags while fishing.

BACKGROUND OF THE INVENTION

When fishing, part of the rig or lure can get stuck on obstruction underneath the water and can cause a snag. A snag prevents the rig being reeled in. Several rigs can be lost over a single fishing session. This costs a fisherman time and money and frustrates the fisherman. While getting snagged and losing gear is one of the less enjoyable aspects of fishing, action can be taken to reduce gear loss and to allow fishermen to spend more time fishing.

The most obvious way to solve getting snagged is to change location. Yet, some populations of fish are limited to areas where the risk of getting snagged is high and changing location is not an option for some fishermen. These fishermen often adopt certain techniques for pulling for a line break when getting snagged. For example, these fishermen may start by gently pulling back on the rod as the weight may come free and it will be possible to reel in normally. However, if the rig does not free itself the fisherman must pull for a break. The fisherman aims to not pull back on the rod too strenuously, as there is serious risk of damaging the gearing of the reel or potentially snapping the rod. These same fishermen may also try to place the rod to one side and pull, at varying angles, the line using his or her hands. If this is not successful, the fisherman is forced to keep pulling until the line snaps, which can require a significant amount of force if strong line is being used. To more easily snap the line, the fisherman can hold the line, turn away from the snag, with the line over his or her shoulder, and walk or drive the boat until the line snaps.

It is important to use the correct sinker or weights when fishing in snaggy locations. A plain lead is great for fishing on a clear, sandy beach as it will roll around and find indentations and gullies which hold fish. However, using a plain lead in an area full of snags will see it roll around until it eventually ends up in a snag. The alternative option is to use a grip lead which will not roll around and stay in one place or use a cheap alternative to expensive weights and simply accept that a lot will be lost over the course of a fishing session.

Fishermen have also tried to solve getting snagged by using specific rig configurations, e.g., the Texas rig, the general rough ground rig, basic rough ground rig, the pulley rig, etc. or by investing in stronger rods, newer and/or lighter jigs, faster retrieval reels, and/or other technological devices.

The Texas rig is a method of rigging a soft plastic in which a conical sinker is threaded onto the line before tying on a hook. The lure is then threaded onto the hook in such a manner that the hook point is concealed in the lure, making it somewhat snagless. The general rough ground rig is specifically designed for rough ground fishing and features some form of weak link release. A weak link release is an item of terminal tackle which allows the weight to detach if it becomes snagged, thereby allowing the rest of the rig, and any fish which have taken the bait, to be retrieved. The weak link release is only attached by a weak link of monofilament.

The basic rough ground rig is simply a variation of the general rough ground rig. It is made using an absolute minimum of components, such as a dropper knot (instead of a swivel crimped between two beads) and a simple weak link release.

The pulley rig acts like a pulley when a fish is hooked and reeled in. The pulley rig thus uses the weight of the fish to pull upwards and away from snags.

An often-overlooked item of terminal tackle is the lift, such as the "lead lift" manufactured and sold by Breakaway Tackle and Development. The lift includes kite shaped plastic fins that are fitted above weights. The lift creates elevation (lift) to raise the weight and therefore the whole rig higher into the water and over potential snags when reeling in. Many fishermen doubt the effectiveness of lifts and question whether lifts work when casting over snags onto a sandy patch of ground.

Thus, there exists a need in the art for a more effective lift.

SUMMARY OF THE INVENTION

Therefore, it is a primary object, feature, or advantage of the present invention to improve on or overcome the deficiencies in the art.

It is still yet a further object, feature, or advantage of the present invention to provide a fishing accessory that prevents snags.

It is still yet a further object, feature, or advantage of the present invention to provide an apparatus that may be used in a wide variety of applications. For example, the improved lift may be used for commercial or recreational fishing.

It is still yet a further object, feature, or advantage of the present invention to provide a safe, cost effective, and durable apparatus.

It is still yet a further object, feature, or advantage of the present invention to provide an apparatus that is aesthetically pleasing.

It is still yet a further object, feature, or advantage of the present invention to practice methods which facilitate use of a fishing accessory accomplishing some or all of the previously stated objectives.

It is still yet a further object, feature, or advantage of the present invention to incorporate the fishing accessory into a rig accomplishing some or all of the previously stated objectives.

The previous list of objects, features, or advantages of the present invention are not exhaustive and do not limit the overall disclosure. Likewise, the following list of aspects or embodiments do not limit the overall disclosure. It is contemplated that any of the objects, features, advantages, aspects, or embodiments disclosed herein can be integrated with one another, either in full or in part.

According to some aspects of the present disclosure, a lift comprises a body having apertures through which the lift secures to a fishing line and wings extending from the body in opposite directions and configured to provide depth to the lift and elevate the rig when the rig is pulled (e.g., reeled) through the water. The apertures may be symmetrically or asymmetrically placed with respect to a longitudinal axis of the body. Moreover, a first aperture may be adapted for surface fishing and a second aperture may be adapted for below surface fishing. In a first embodiment, the body has a substantially triangularly shaped base and sides extending upward from the substantially triangular shaped base; the wings extend from the sides.

In an alternative embodiment, the body comprises a leading edge. The body then tapers into a V-shape towards a trailing edge. The wings typically comprise a primary wing section extending upwardly from the body and a secondary wing section extending outwardly from the primary wing section.

According to some other aspects of the present disclosure, a fishing line, a weight, a hook, and the lift forms a rig. The weight and the lift are attached to the fishing line. More particularly, the lift secures to the fishing line via the apertures in the body of the lift. The fishing line can include a leader at an outer end of the fishing line. The hook can be attached to live bait or form part of a lure. The hook can hide within the lift when the rig moves through the water. The lure can be selected from the group consisting of a jig and a spinnerbait.

According to some other aspects of the present disclosure a method of preventing snags while fishing comprises securing a lift to a fishing line adjacent a hook, the lift having a base with upstanding opposite sides and outwardly extending wings, casting the fishing line out into water, allowing the hook and lift to sink into the water, and reeling in the fishing line, whereby the lift protects the hook from snags.

These or other objects, features, and advantages of the present invention will be apparent to those skilled in the art after reviewing the following detailed description of the illustrated embodiments, accompanied by the attached drawings.

Figure 1:
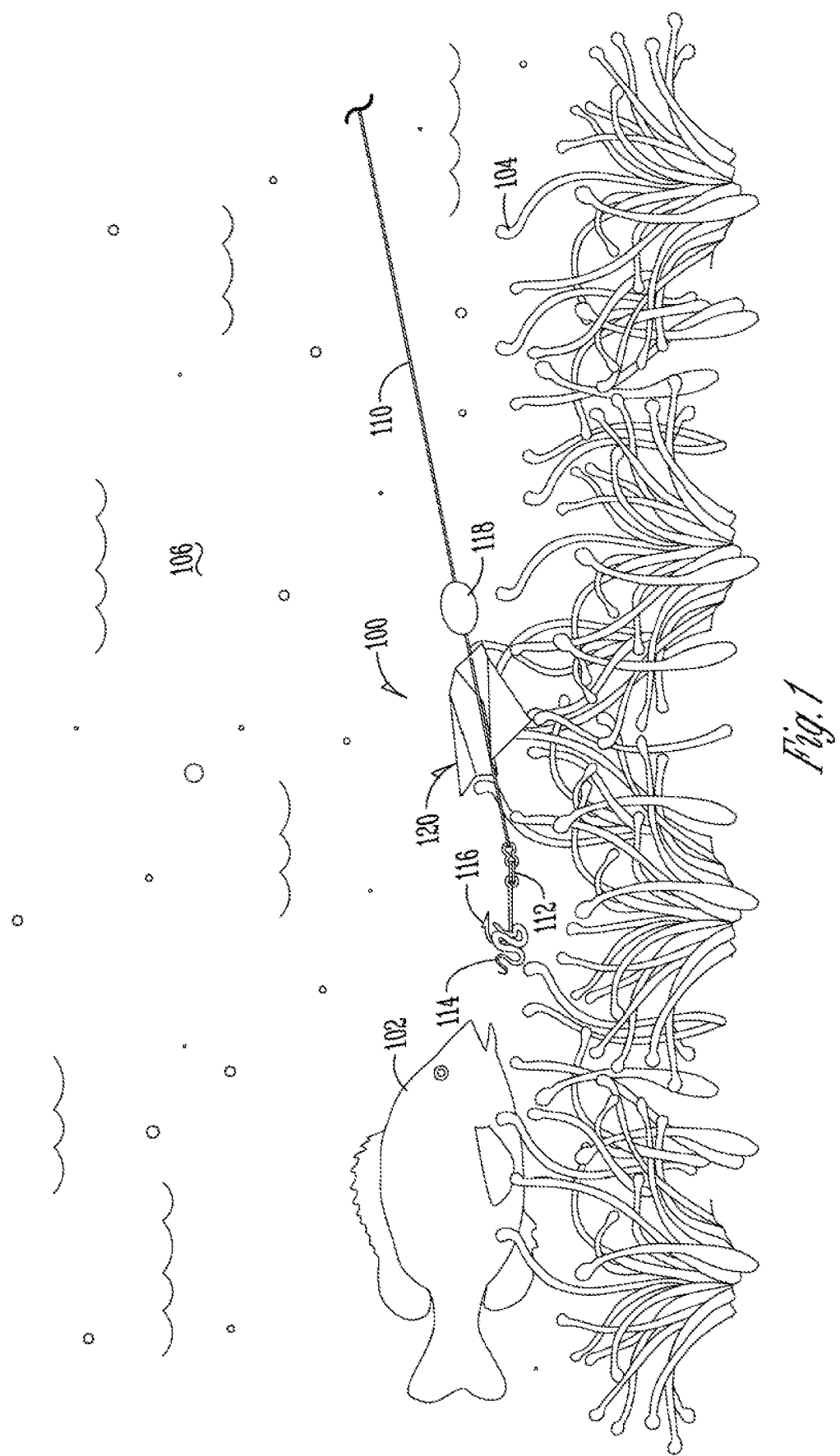
FIG. 1 shows an illustrative view of a system for fishing which incorporates an improved lift.

The present disclosure illustrates several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes. The drawings may not be to scale and unless otherwise indicated, proportions of features in the drawings shall not be construed as evidence of actual proportions.

DETAILED DESCRIPTION OF THE INVENTION

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

FIG. 1 shows a fishing system 100 for catching fish 102. The fishing system is particularly adapted to avoid snags, for example between cover 104 (typically an object, such as vegetation, a stump or rock, that creates an ambush point for a predator) at the bottom of a body of water 106 (e.g. a river, lake, stream, ocean, etc. which serves as a habitat for the fish 102) and a rig 108 used by a fisherman.

As shown in FIG. 1, a leader 112 is included at an outer end (i.e., business end) of the main fishing line 110. The leader 112 makes up at least one component of the terminal tackle, said terminal tackle referring to gear that is attached to the end of the fishing line 110. The leader 112 is a separate length to which the rig 108 or fishing bait 114 is tied. The fishing line 110 and the leader 112 are typically connected by tying the two pieces together with knot(s) or by tying each line to the separate ends of a swivel with the swivel acting as the joining mechanism between the two.

The rig 108 is an arrangement of items used for fishing. It can be assembled of one or more fishing lines 110, a leader 112, lures (e.g. fishing bait 114), hooks (e.g. hook 116), sinkers, bobbers, swivels, beads, other fishing tackle, and the like. The rig 108 might be held by a rod, by hand, or attached to a boat or pier. The rig 108 of the present disclosure is typically configured to sink (e.g., with weight 118) to the bottom of the water 106, rather than float near the surface. However, the present disclosure is not to be limited by such a configuration. For example, the rig 108 could be adapted for trolling, catching a single species of fish 102, or catching a broad range of species of fish 102. In some embodiments, fishing bait 114 comprises a lure, such as a jig, spinnerbait, or the like.

Many lures are equipped with one or more hooks 116 that are used to catch fish when they strike the lure. The design of the hook 116 can vary with respect to the hook type, color, angle of the hook or the material of the hook. The lure uses movement, vibration, flash and color to bait fish. Once the fish is attracted to the lure, the hook 116 helps secure the fish to the fishing line 110 so that the fish may be reeled in by the angler.

Figure 2:
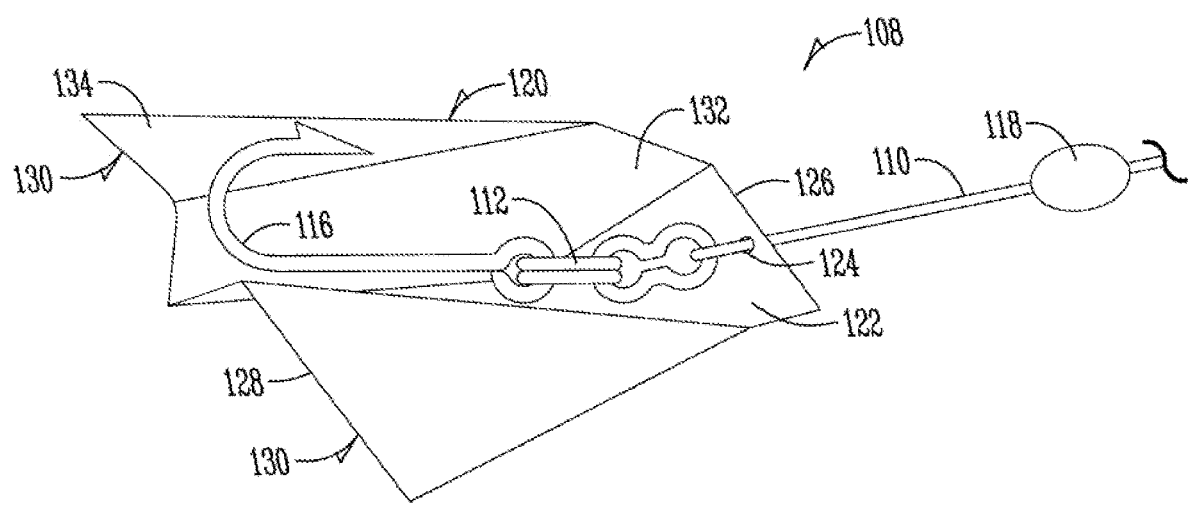
FIG. 2 shows a detailed view of a rig used in the system of FIG. 1.
Figure 4:
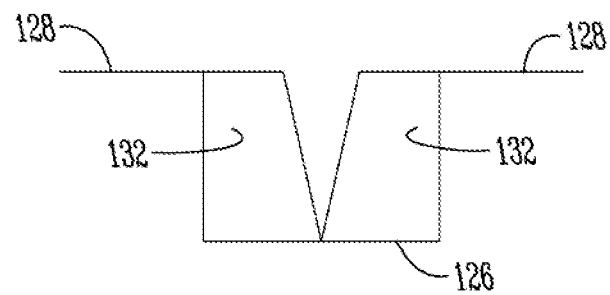
FIG. 4 shows a side elevation view of an improved lift.
Figure 5:
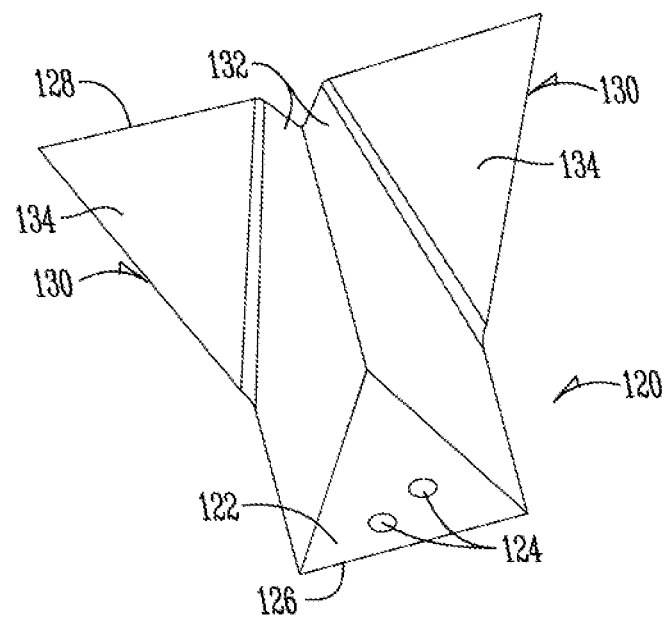
FIG. 5 shows a rear perspective view of an improved lift.

In the embodiment shown in FIGS. 1-2, the rig 108 includes a weight 118 comprising a fishing sinker or knoch. In the preferred embodiment, the rig 108 also includes a fishing accessory, and particularly, the lift(s) 120 of FIGS. 3-5. The lift 120 includes a body 122 having a substantially triangular shaped base and apertures 124 for securing (e.g., by tying knot(s)) the lift 120 to the fishing line 110, to the leader 112 of the fishing line 110, to the fishing bait 114, to the hook 116, and/or to the weight 118. In at least one embodiment, the lift 120 can is integrally formed of a single, rigid material and thus the sections of the lift 120 comprise a one-piece construction. In this way, the one-piece construction can be free of, or substantially free of, a hinge. In some other alternative embodiments, the lift 120 can be made up of several smaller components, which may or may not move freely with respect to one another.

The top aperture 124 is well suited for surface fishing, while the bottom hole is well suited for below surface fishing. The apertures 124 may be positioned towards a leading edge 126 of the body 122, symmetrically positioned on the body 122 with respect to at least one axis, e.g., along a central longitudinal axis (i.e., y-axis) of the body 122 (e.g., the apertures 124 of FIGS. 2-4), and/or may be asymmetrically positioned on the body 122 with respect to at least one axis (e.g., the apertures 124 of FIG. 5). The leading edge 126 will be the edge that leads when the rig 108 is being reeled in.

The body 122 typically terminates in a V-shape towards the trailing edge 128. The angle of the V-shape is, preferably, between 40° and 140°; more preferably, between 55° and 125°; and most preferably, between 85° and 95°, i.e., a substantially 90° V-shape.

Figure 3:
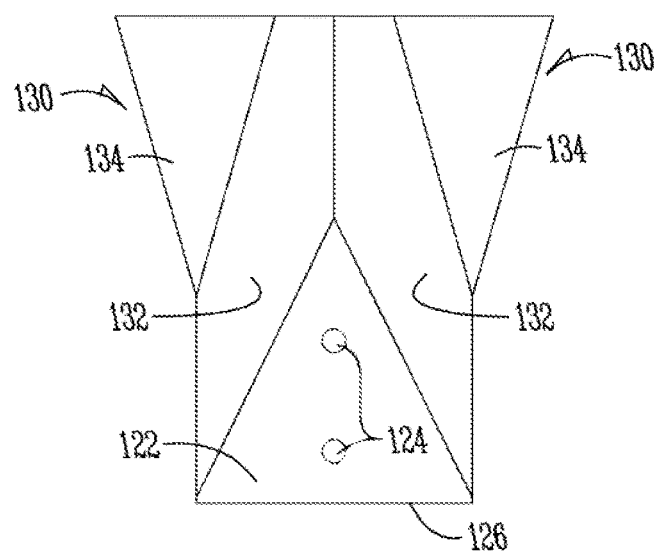
FIG. 3 shows a top elevation view of an improved lift.

There is at least one wing 130 located at each leg of the V-shape, as particularly shown in FIG. 3. The wings 130 act similar to airfoils in that the wings 130 are primarily responsible for elevating the lift 120. The wings 130, preferably, comprise primary wing sections or sides 132 which bend upward from the body 122 to give the lift 120 a depth or height. The depth of the lift 120 allows the hook 116 to rest inside an inner area of the lift 120 when being reeled in.

The wings 130 also comprise secondary flat wing sections 134, which have a triangular shape with a forward apex, attached to the primary wing sections or sides 132 and extend outward from the primary wing sections or sides 132.

The secondary wing sections 134 are spaced above the base 122, such that the lift 120 is not planar, and has a depth or height. The separate wing sections are attached via, preferably, a substantially 145° angle, however other angles are contemplated by the present disclosure. Moreover, the secondary wing sections 134 attach to the primary wing sections 132 towards an upper and outer portion of the primary wing sections 132 which allow the secondary wing sections 134 to flare even more outward, giving the lift 120 a substantial overall width.

The structural configuration of the wings 130 also helps deflect the lift 120 away from debris and cover 104 in the water 106 should the rig 108 still get snagged before the lift 120 has a chance to elevate above the cover 104.

To fish with the fishing system 100, an angler will first attach the fishing bait 114, the hook 116, the weight 118, and/or the lift lead 120 onto the leader 112 of the fishing line 110 or directly onto the fishing line 110. The angler then casts the rig 108 into the water 106, perhaps near cover 104, in attempt to catch a fish 102. The angler can be located on a shore, on a dock, in a boat, or any other suitable location from which one can fish.

The user may lure the fish 102 towards the hook 116 with the fishing bait 114 in hopes that the fish 102 will bite the bait and pierce the hook 116. To further entice the fish to bite the bait, the angler may use bait of a bright color, move the bait, or odorize the bait, and the like. Most fish caught by jigs are on or near the bottom of the water 106 near cover 104, increasing the likelihood of snags. If the fish 102 pierces the hook 116, the user can reel in the fish 102 with a fishing reel. As the user reels in the fish 102, wings 130 of the fishing accessory act as an airfoil and create lift. This causes the lift 120 to ascend to the surface of the water 106 and aids in catching the fish.

The longer a fish 102 does not pierce the hook 116, the more opportunity there is for a snag. For example, the rig 108 may get moved around by the current of the water 104 or the angler may move or reel in the hook 116 to another area more likely to attract a fish 102. While the rig 108 moves around in the water without a fish 102 hooked to the fishing line 110, wings 130 of the fishing accessory act as an airfoil and create lift, thus leaving no opportunity for the hook or weight to become snagged, for example on cover 104.

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.
100 fishing system
102 fish
104 cover
106 water
108 rig
110 fishing line
112 leader
114 fishing bait (e.g., live bait, lure)
116 hook
118 weight
120 lift
122 body
124 apertures
126 leading edge
128 trailing edge
130 wings
132 primary wing section (e.g., sides)
134 secondary wing section The present disclosure is not to be limited to the particular embodiments described herein. The following claims set forth a number of the embodiments of the present disclosure with greater particularity.

What is claimed is:

1. A fishing rig comprising:
   a fishing line:
   a lift comprising:
      a flat body forming a leading edge of the fishing rig, with an aperture on the leading edge through which the fishing line extends to mount the lift onto the line;
      sides extending upwardly from the body; and
      flat wings extending outwardly from the sides in opposite directions and extending rearwardly to a trailing edge of the fishing rig, and configured to provide depth to the lift and rig when the fishing line pulls the lift through water;
   a weight secured to the fishing line allowing the rig to sink in water;
   and a hook attached to the fishing line and residing between the wings.

2. The fishing rig of claim 1, wherein the line comprises a leader adjacent an outer end of the fishing line.

3. The fishing rig of claim 1, wherein the body comprises a substantially triangularly shaped base.

4. The fishing rig of claim 1, further wherein the body tapers into a V-shape towards the trailing edge of the fishing rig.

* * * * *